[12] United States Patent
Murayama

(10) Patent No.: US 10,870,416 B2
(45) Date of Patent: Dec. 22, 2020

(54) BRAKE CONTROLLER, BRAKE CONTROL METHOD AND BRAKE CONTROL SYSTEM

(71) Applicant: TOYOTA JIDOSHA KABUSHIKI KAISHA, Toyota (JP)

(72) Inventor: Yasushi Murayama, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 357 days.

(21) Appl. No.: 15/954,957

(22) Filed: Apr. 17, 2018

(65) Prior Publication Data
US 2018/0312147 A1 Nov. 1, 2018

(30) Foreign Application Priority Data
Apr. 27, 2017 (JP) .................................. 2017-088923

(51) Int. Cl.
*B60T 8/172* (2006.01)
*B60T 1/06* (2006.01)
*B60T 8/171* (2006.01)
*B60T 17/22* (2006.01)
*B60T 13/66* (2006.01)
*F16D 65/00* (2006.01)
*B60T 8/1766* (2006.01)
*B60T 8/00* (2006.01)
*B61H 1/00* (2006.01)

(52) U.S. Cl.
CPC .............. *B60T 8/172* (2013.01); *B60T 1/065* (2013.01); *B60T 8/171* (2013.01); *B60T 8/1766* (2013.01); *B60T 13/662* (2013.01); *B60T 17/22* (2013.01); *F16D 65/0006* (2013.01); *B60T 8/00* (2013.01); *B61H 1/00* (2013.01)

(58) Field of Classification Search
CPC ........ B60T 8/172; B60T 17/22; B60T 13/662; B60T 8/1766; B60T 1/065; B60T 8/171; B60T 8/00; F16D 65/0006; B61H 1/00
USPC .......................................................... 701/70
See application file for complete search history.

(56) References Cited

U.S. PATENT DOCUMENTS

2017/0002881 A1* 1/2017 Masuda ................ F16D 66/021

FOREIGN PATENT DOCUMENTS

| JP | 07-017376 A | | 1/1995 |
|----|-------------|---|--------|
| JP | 2005-324677 A | | 11/2005 |
| JP | 2014-069602 | * | 4/2014 |
| JP | 2014-069602 A | | 4/2014 |

* cited by examiner

Primary Examiner — Muhammad Shafi
(74) Attorney, Agent, or Firm — Sughrue Mion, PLLC

(57) ABSTRACT

A brake controller is configured to control a brake device. The brake device applies a braking force to each of wheels by moving a pad toward a rotor provided for each of the wheels and pressing the pad against the rotor. The brake controller includes: a pressing force detection section configured to detect a pressing force information corresponding to a pressing force by which the pad is pressed against the rotor during braking; a stroke detection section configured to detect a stroke information corresponding to a stroke amount of the pad toward the rotor during braking, wherein the brake controller distributes the braking force to each of the wheels such that the pressing force is in a range other than a predetermined range, and sets the predetermined range based on the pressing force information and the stroke information.

9 Claims, 4 Drawing Sheets

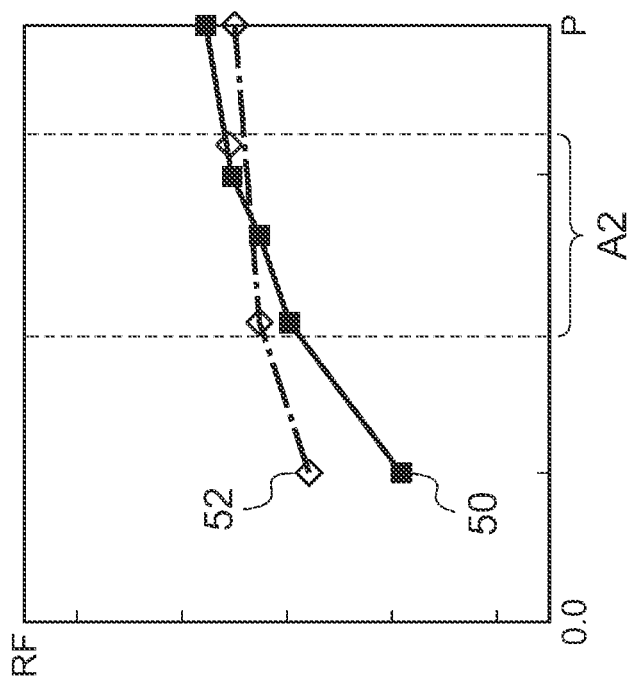
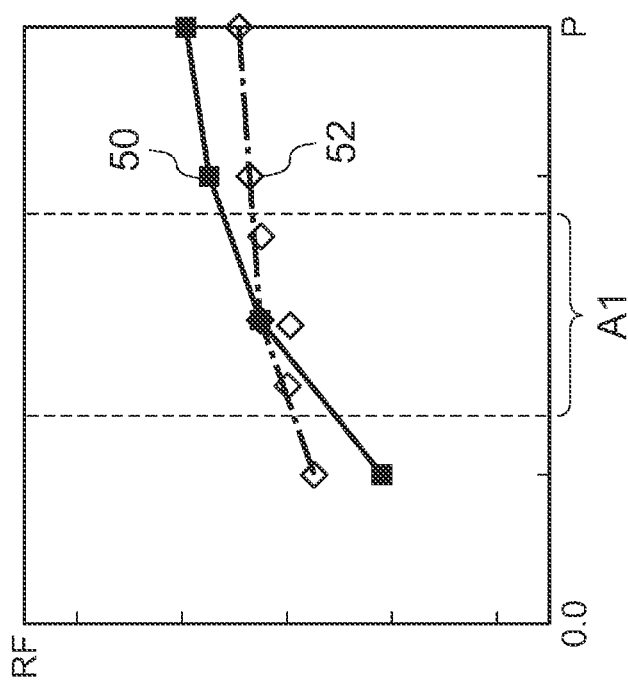

BRAKE CONTROLLER, BRAKE CONTROL METHOD AND BRAKE CONTROL SYSTEM

INCORPORATION BY REFERENCE

The disclosure of Japanese Patent Application No. 2017-088923 filed on Apr. 27, 2017 including the specification, drawings and abstract is incorporated herein by reference in its entirety.

BACKGROUND

1. Technical Field

The disclosure relates to a brake controller, a brake control method and a brake control system each of which controls driving of a brake device provided for each wheel.

2. Description of Related Art

A braking system is disclosed in Japanese Patent Application Publication No. 2014-69602 (JP 2014-69602 A), and the braking system includes: a disc rotor provided for each wheel; a caliper provided on each of the disc rotors; a piston provided in each of the calipers; and a brake pad pressed against the disc rotor by strokes of the piston. This braking system is driven when a control unit controls a pressing force of the brake pad against the disc rotor.

The control unit disclosed in JP 2014-69602 A stores a brake noise region that corresponds to a range of the pressing force of the brake pad where brake noise is generated. In the case where the pressing force of the individual brake pad falls within the brake noise region, the pressing force of the individual brake pad is adjusted to fall out of the range corresponding to the brake noise region while an entire braking force of a vehicle is maintained.

SUMMARY

When the brake pad is worn over time, the brake noise region where the brake noise is generated is also changed over time. Since the brake noise region is static for the braking system disclosed in JP 2014-69602 A, the brake noise is possibly generated when the brake pad is worn. Meanwhile, in the case where the brake noise region is set to be a large region in advance in consideration of wear of the brake pad, the adjustment of the braking force, which is performed to avoid the pressing force from falling within the brake noise region, possibly becomes difficult.

The disclosure provides a brake, a brake control method and a brake control system controller capable of preventing generation of brake noise in accordance with a state of a brake pad.

An aspect of the present disclosure is related to a brake controller configured to control a brake device, the brake device applying a braking force to each of wheels by moving a pad toward a rotor provided for each of the wheels and pressing the pad against the rotor, the brake controller configured to distribute the braking force to each of the wheels such that a pressing force by which the pad is pressed against the rotor during braking is in a range other than a predetermined range, the brake controller including: a pressing force detection section configured to detect a pressing force information corresponding to the pressing force; and a stroke detection section configured to detect a stroke information corresponding to a stroke amount of the pad toward the rotor during braking, wherein the brake controller sets the predetermined range based on the pressing force information and the stroke information.

The brake controller according to the above aspect may derive the predetermined range as a noise region corresponding to a range of the pressing force where brake noise is generated.

The brake controller according to the above aspect may further include a contact rigidity derivation section configured to derive, based on the pressing force information and the stroke information, a contact rigidity of the pad which comes into contact with the rotor, wherein the brake controller may derive the predetermined range in accordance with the contact rigidity.

With the brake controller according to the above aspect, the noise region where the brake noise is generated is derived in accordance with the contact rigidity, and brake control to avoid the brake noise is executed. By deriving the noise region in accordance with the contact rigidity, the braking force for each of the wheels can be distributed in consideration of a state of the pad such as wear, and generation of the brake noise can thereby be prevented.

The brake controller according to the above aspect may adjust the predetermined range such that the pressing force is reduced as the contact rigidity is increased.

The brake controller according to the above aspect may derive a first predetermined range as the predetermined range such that the pressing force is reduced from a predetermined region in a case where the contact rigidity is equal to or higher than a specified value, and the brake controller may derive a second predetermined range as the predetermined range such that the pressing force is increased from the first predetermined range in a case where the contact rigidity is lower than the specified value.

With the brake controller according to the above aspect, the appropriate noise region can be set in accordance with the contact rigidity.

In the brake controller according to the above aspect, the pad of the brake device may be stroked toward the rotor by driving a motor; the pressing force detection section may detect the pressing force information based on an output of a load sensor that detects the pressing force or an output of a current value acquisition section that acquires a current value supplied to the motor; and the stroke detection section may detect the stroke information based on an output of a stroke sensor that detects the stroke amount of the pad or an output of a rotation angle detection section that detects a rotation angle of the motor.

In the above aspect, in the electric brake device that is driven by the motor, the output of the sensor that is used for feedback, a failure determination, and the like is also used for prevention control of the brake noise. Therefore, with the brake controller according to the above aspect, the sensor can be shared, and the cost thereof can be cut.

The brake controller according to the above aspect may distribute the braking force for each of the wheels so as not to apply the pressing force equal to or smaller than a specified pressing force to the rotor of at least one of a front wheel and a rear wheel.

With the brake controller according to the above aspect, the brake noise, which is possibly generated during braking with the small pressing force, can be prevented.

The brake controller according to the above aspect may further include a braking force computation section. The braking force computation section may be configured to compute a total braking force for a vehicle, wherein the brake controller may distribute the braking force only to a front wheel or only to a rear wheel in a case where the total braking force that is computed by the braking force computation section is smaller than a specified value.

Another aspect of the present disclosure is related to a brake control method for controlling a brake device, the brake control method setting a pressing force by which a pad of the brake device is pressed against a rotor of the brake device during braking such that the pressing force is in a range other than a predetermined range, the brake control method including: detecting a pressing force information corresponding to the pressing force; detecting a stroke information corresponding to a stroke amount of the pad toward the rotor during braking; and setting the predetermined range based on the pressing force information and the stroke information.

Another aspect of the present disclosure is related to a brake control system. The brake control system includes: a brake device including a pad and a rotor, the brake device applying a braking force to each of wheels by moving the pad toward the rotor provided for each of the wheels and pressing the pad against the rotor; and a brake controller configured to: detect a pressing force information corresponding to a pressing force by which the pad is pressed against the rotor during braking; detect a stroke information corresponding to a stroke amount of the pad toward the rotor during braking; distribute the braking force to each of the wheels such that the pressing force is in a range other than a predetermined range; and set the predetermined range based on the pressing force information and the stroke information.

The disclosure can provide the brake controller, the brake control method and the brake control system capable of preventing the generation of the brake noise in accordance with the state of the pad.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3A is a graph illustrating a noise region of a pressing force;

FIG. 3B is a graph illustrating a noise region of a pressing force;

DETAILED DESCRIPTION OF EMBODIMENTS

Figure 1:
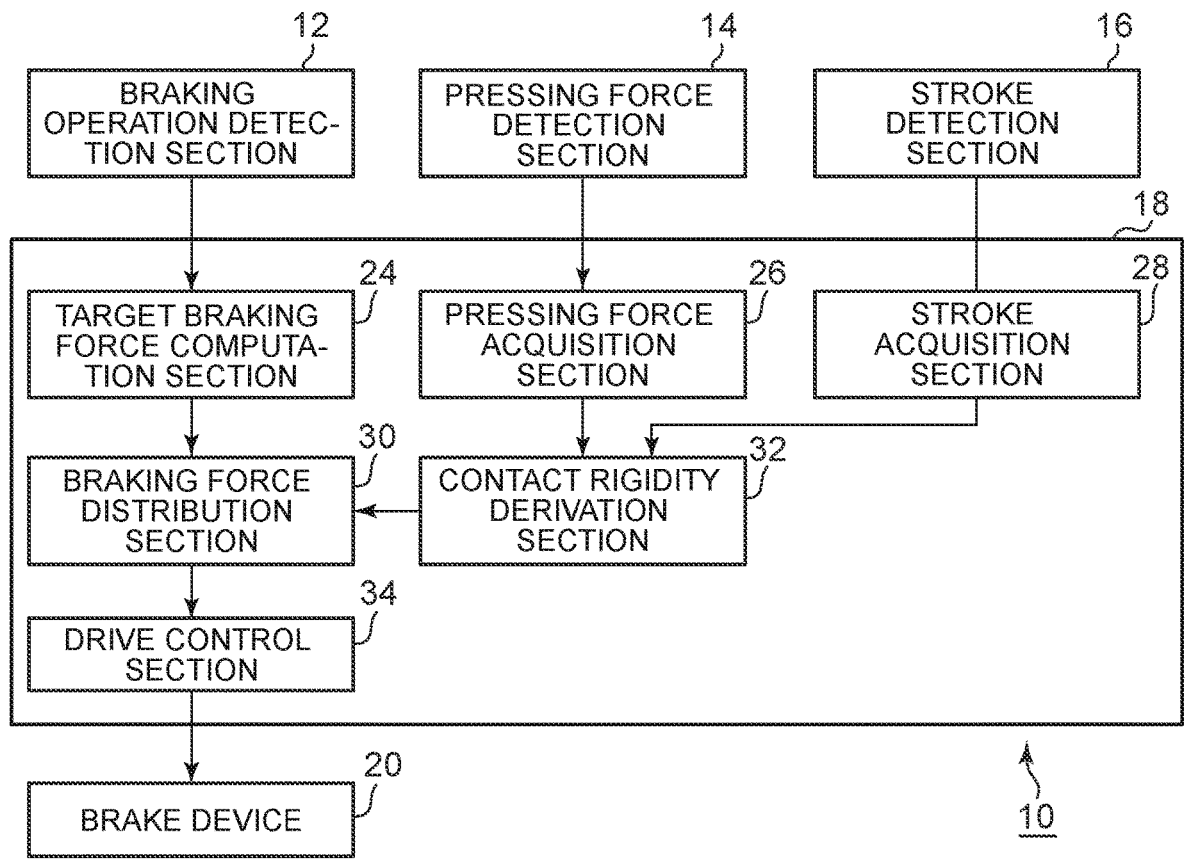
FIG. 1 is a diagram illustrating a functional configuration of a brake controller according to an embodiment.

FIG. 1 is a diagram illustrating a functional configuration of a brake controller 10 according to an embodiment. The brake controller 10 executes control for adjusting a braking force to be applied to each wheel of a vehicle so as to prevent abnormal noise, that is, so-called brake noise generated during braking.

The brake controller 10 includes a braking operation detection section 12, a pressing force detection section 14, a stroke detection section 16, and a processing section 18 and controls driving of a brake device 20.

The braking operation detection section 12 detects a braking operation by a driver and sends a detection result to the processing section 18. The braking operation detection section 12 detects an operation amount of a brake pedal, for example. The processing section 18 decides the braking force to be applied to each of the wheels on the basis of the detection result of the braking operation detection section 12.

The brake device 20 is provided for each of the wheels and applies the braking force to the corresponding wheel by driving a motor. The braking force corresponds to a braking command from the processing section 18. The brake device 20 on a front wheel side may be configured to have higher output performance than the brake device 20 on a rear wheel side and to be able to generate the larger braking force than the brake device 20 on the rear wheel side.

The motor in the brake device 20 is provided for each of the wheels, can independently be driven for the corresponding wheel in accordance with a command signal from the processing section 18, and can apply the braking force that differs by the wheels. An electric motor used to brake has superior braking responsiveness of the corresponding wheel when compared with the using of brake fluid, and can accurately control the braking force of the corresponding wheel.

Figure 2:
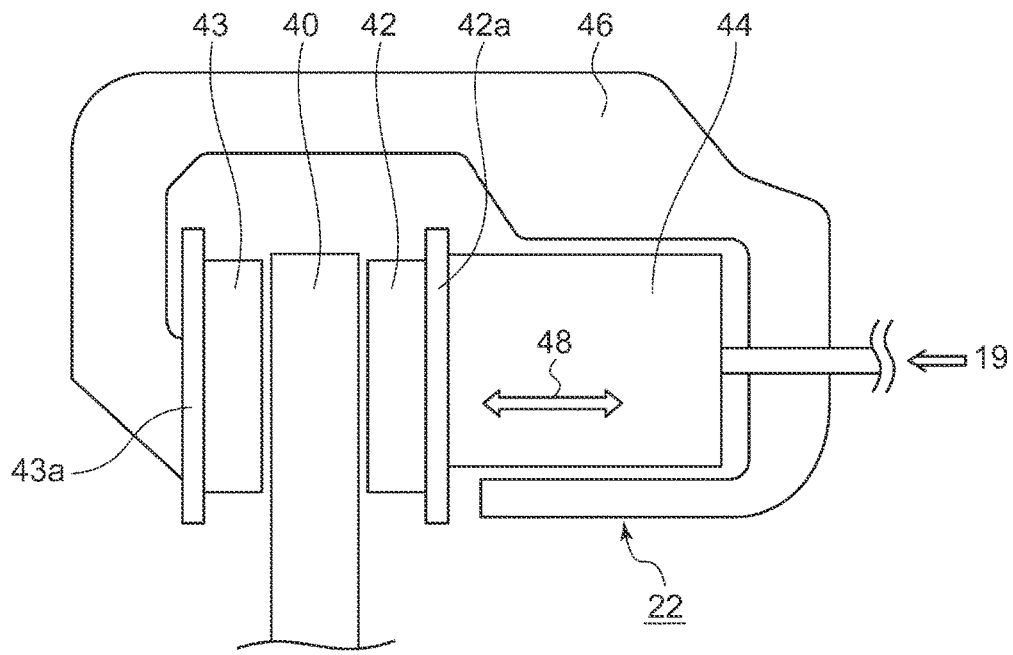
FIG. 2 is a view illustrating a brake device.

FIG. 2 is a view illustrating the brake device 20. The brake device 20 includes a motor 19, pads 42, 43, a piston 44, and a caliper 46. The pad 42 is pressed against a rotor 40 that coaxially rotates with a wheel. The pads 42, 43 are provided in one pair and are opposite to each other with the rotor 40 being held between the pads 42, 43. The pad 42 has a plate-shaped base metal 42a, and the base metal 42a is coupled to the piston 44. A base metal 43a of the pad 43 is coupled to the caliper 46.

The piston 44 is coupled to the one pad 42 and causes the pad 42 to stroke toward the rotor 40. That is, the piston 44 causes the pad 42 to advance toward or retreat from the rotor 40 by driving of the motor 19. A stroke amount of the piston 44 in a stroke direction 48 is detected by the stroke detection section 16 and corresponds to a stroke amount of the base metal 42a of the pad 42.

The caliper 46 is supported on a vehicle body side and can move along the stroke direction 48 of the piston 44. When the one pad 42 is pressed against the rotor 40 by the stroke of the piston 44, the caliper 46 moves in an opposite direction by a reaction force, and the other pad 43 is pressed against the rotor 40. In this way, the rotor 40 is held and pressed by the pad 42, and thereby apply a brake on the wheel.

Referring back to FIG. 1, the pressing force detection section 14 detects pressing force information on a pressing force to press the pad 42 against the rotor 40 during braking, and sends a detection result to the processing section 18. The pressing force detection section 14 is a load sensor that is attached to the brake device 20 and detects the pressing force that is applied to the base metal 42a of the pad 42, for example. Alternatively, the pressing force detection section 14 may be a current acquisition section that acquires a current value supplied to the motor 19. The pressing force detection section 14 detects the pressing force information on the basis of output of the load sensor or the current acquisition section for the motor 19.

The stroke detection section 16 detects stroke information on a stroke amount of the pad 42 with respect to the rotor 40 during braking. That is, the stroke detection section 16 detects a deformation amount of the pad 42 at a time when the pad 42 is pressed against the rotor 40 during braking, and sends a detection result to the processing section 18. The stroke detection section 16 detects the stroke amount of the piston 44, that is, the stroke amount of base metal 42a of the pad 42, in the stroke direction 48 shown in FIG. 2. The stroke detection section 16 is a stroke sensor that detects a moving distance of the pad 42 in the stroke direction 48, for example. The stroke sensor may be provided on the piston 44 and detects the stroke amount of the piston 44, so as to be able to detect the stroke amount of the pad 42 that moves together with the piston 44. Alternatively, the stroke detection section 16 may be a rotation angle detection section that detects a rotation angle of the motor 19. The stroke detection section 16 detects the stroke information on the basis of output of the stroke sensor or the rotation angle detection section.

In the brake device 20 that uses the electric motor 19 as a drive source, the output of the load sensor or the current acquisition section and the stroke sensor or the rotation angle detection section are used for brake control feedback, a fail determination of the brake control, and the like. When the same sensors as that used for feedback control and the like are used for control to prevent the brake noise, the sensors can be shared in plural types of the control, and thus cost can be reduced.

The processing section 18 receives the detection result from each of the detection sections, computes a target braking force of the entire vehicle on the basis of the detection results, decides an individual braking force for each of the wheels on the basis of the target braking force, drives each of the motors 19 in accordance with the decided individual braking force, and makes the brake device 20 execute braking.

The processing section 18 can be configured by including a circuit block, memory, and large-scale integration (LSI) as hardware, and can also be realized by a program that is loaded in the memory as software. The functional blocks of the processing section 18 can be realized by any of various configurations that include the hardware only, the software only, or a combination of hardware and software, and thus the processing section 18 is not limited to any of the foregoing configurations.

The processing section 18 has a target braking force computation section 24, a pressing force acquisition section 26, a stroke acquisition section 28, a braking force distribution section 30, a contact rigidity derivation section 32, and a drive control unit 34. The target braking force computation section 24 computes the target braking force of the entire vehicle on the basis of the detection result of the braking operation detection section 12, and computes the individual target braking force for each of the wheels on the basis of the target braking force of the entire vehicle. The target braking force computation section 24 sends the computed individual target braking force for each of the wheels to the braking force distribution section 30.

The pressing force acquisition section 26 acquires the pressing force information from the pressing force detection section 14. The stroke acquisition section 28 acquires the stroke information from the stroke detection section 16. The pressing force acquisition section 26 and the stroke acquisition section 28 send the pressing force information and the stroke information to the contact rigidity derivation section 32.

The contact rigidity derivation section 32 derives contact rigidity K between the pad 42 and the rotor 40 on the basis of the pressing force information and the stroke information. The contact rigidity K corresponds to a spring constant of the pad 42 that vibrates during braking.

A relationship between a pressing force P and a stroke value S for the contact rigidity K is expressed by the following equation (1).

$$K=P/S \tag{1}$$

The pressing force P is a force by which the pad 42 is pressed against the rotor 40 after the pad 42 abuts the rotor 40. The stroke value S is a distance for which the base metal of the pad 42 moves in the stroke direction 48 after the pad 42 abuts the rotor 40. The stroke value S is zero when the pad 42 starts abutting the rotor 40. The contact rigidity K is derived at timing at which the pad 42 starts abutting the rotor 40, and the abutment of the pad 42 against the rotor 40 is detected by the load sensor in the pressing force detection section 14. Just as described, the contact rigidity K is derived from the pressing force information on the pad 42 being pressed against the rotor 40 and the stroke information indicative of the deformation amount by which the pad 42 is pressed against the rotor 40 and is deformed.

The contact rigidity K is reduced with progress of wear of the pad 42 over time. The contact rigidity K is also changed by a temperature, and the contact rigidity K is increased as the temperature increases. A frequency of the pad 42 that vibrates at the time of contacting the rotor 40 can be computed by using the contact rigidity K, and a noise region of the pressing force where a possibility of generation of the brake noise is high can be derived.

FIG. 3A and FIG. 3B illustrates the noise region of the pressing force. In each of FIG. 3A and FIG. 3B, a vertical axis represents a resonance frequency RF, and a horizontal axis represents the pressing force P. A first resonance line 50 represents a resonance analysis result of a rotor system, that is, the pad 42 that comes into contact with the rotor 40 and vibrates during braking. A second resonance line 52 represents a resonance analysis result of a caliper system during braking.

The resonance analysis results shown in FIG. 3A indicate that the brake noise is likely to be generated in the case where the pressing force P falls within a noise region A1. Therefore, the pressing force should avoided falling within the noise region A1 in order to restrain the generation of the brake noise. The brake noise is generated when the resonance frequency RF of the rotor system and the resonance frequency RF of the caliper system come close to each other. In the noise region A1, the resonance frequency RF of the rotor system and the resonance frequency RF of the caliper system have values that are close to each other. The range of the pressing force P indicated by the noise region A1 is set for each type of the brake device 20 by an experiment or the like.

This noise region A1 is shifted on the basis of the contact rigidity K, that is, due to a state change of the pad 42 such as a degree of wear of the pad 42, a temperature of the pad 42, and the like. The resonance analysis results shown in FIG. 3B indicate a case where the contact rigidity K is lower than that in the resonance analysis results shown in FIG. 3A, and also indicate a state where the wear of the pad 42 is progressed. In the second resonance line 52 of the caliper system, the resonance frequency RF is not changed by the contact rigidity K. Meanwhile, in the first resonance line 50 of the rotor system including the pad 42, as the contact rigidity K is reduced, the resonance frequency RF is changed to be reduced as shown in FIG. 3B.

As shown in FIG. 3B, when the resonance frequency RF on the first resonance line 50 of the rotor system is reduced, a range where the first resonance line 50 approximates the second resonance line 52 of the caliper system is changed, and a noise region A2 is shifted to a side where the pressing force is large. That is, when the contact rigidity K is reduced due to the progress of wear of the pad 42, the brake noise is generated with the large pressing force. Meanwhile, when the contact rigidity K is increased due to the temperature increase, the brake noise is generated with the small pressing force.

The braking force distribution section 30 derives the noise region in accordance with the contact rigidity K that is received from the contact rigidity derivation section 32 during braking, and distributes the individual target braking force to each of the wheels in such a manner as to avoid the pressing force that falls within the derived noise region. The pressing force of the pad 42 is proportional to the individual target braking force, and the braking force distribution section 30 has a map or an equation used to compute the pressing force of the pad 42 from the braking force for each of the wheels. The braking force distribution section 30 adjusts the individual target braking force for each of the wheels (the pressing force of the pad 42) so as to maintain the target braking force of the entire vehicle. When the noise region is set in accordance with the contact rigidity K and the individual target braking force for each of the wheels is thereby adjusted, the generation of the brake noise can be prevented with the state of the pad 42 such as a worn state and the temperature of the pad 42 being reflected. In addition, the state of the pad 42 can be detected from the contact rigidity K. Thus, the noise region may not have to be set large when taking the wear of the pad 42 into consideration. Therefore, the noise region can be set accurately.

The braking force distribution section 30 may have a map that represents a relationship between the contact rigidity K and the noise region, and may also have an equation used to compute the noise region from the contact rigidity K. In the case where types of the brake device 20 differ between the front wheel and the rear wheel, the braking force distribution section 30 may derive the different noise regions for the front wheel and the rear wheel. As the contact rigidity K is increased, the braking force distribution section 30 derives the noise region where the range of the pressing force P is shifted such that the pressing force is reduced. As the contact rigidity K is reduced, the braking force distribution section 30 derives the noise region where the range of the pressing force P is shifted such that the pressing force is increased. That is, in a state where the contact rigidity K is high, an upper limit of the range of the pressing force P is low when compared with an upper limit of the range of the pressing force P in a state where the contact rigidity K is low. Furthermore, in a state where the contact rigidity K is high, an lower limit of the range of the pressing force P is low when compared with an lower limit of the range of the pressing force P in a state where the contact rigidity K is low.

In addition, the braking force distribution section 30 executes small pressing force control in which the individual target braking force is distributed so as not to apply the pressing force equal to or smaller than a specified pressing force to the rotor 40 of each of the wheels. More specifically, in the case where the target braking force for at least one of the front wheel and the rear wheel is equal to or smaller than a specified value, or in the case where the pressing force of the pad 42 that is applied to the rotor 40 of at least one of the front wheel and the rear wheel is equal to or smaller than the specified pressing force, the braking force distribution section 30 distributes the individual target braking force such that the individual target braking force for one of the front wheel and the rear wheel is set to zero while the individual target braking force for the other of the front wheel and the rear wheel is increased. For example, in the case where the pressing force P for the rear wheels are equal to or smaller than the specified pressing force, the braking force distribution section 30 sets the pressing force P for the rear wheels to zero and adds a magnitude of the pressing force P corresponding to that for the rear wheel to the pressing force P for the front wheels.

Figure 4:
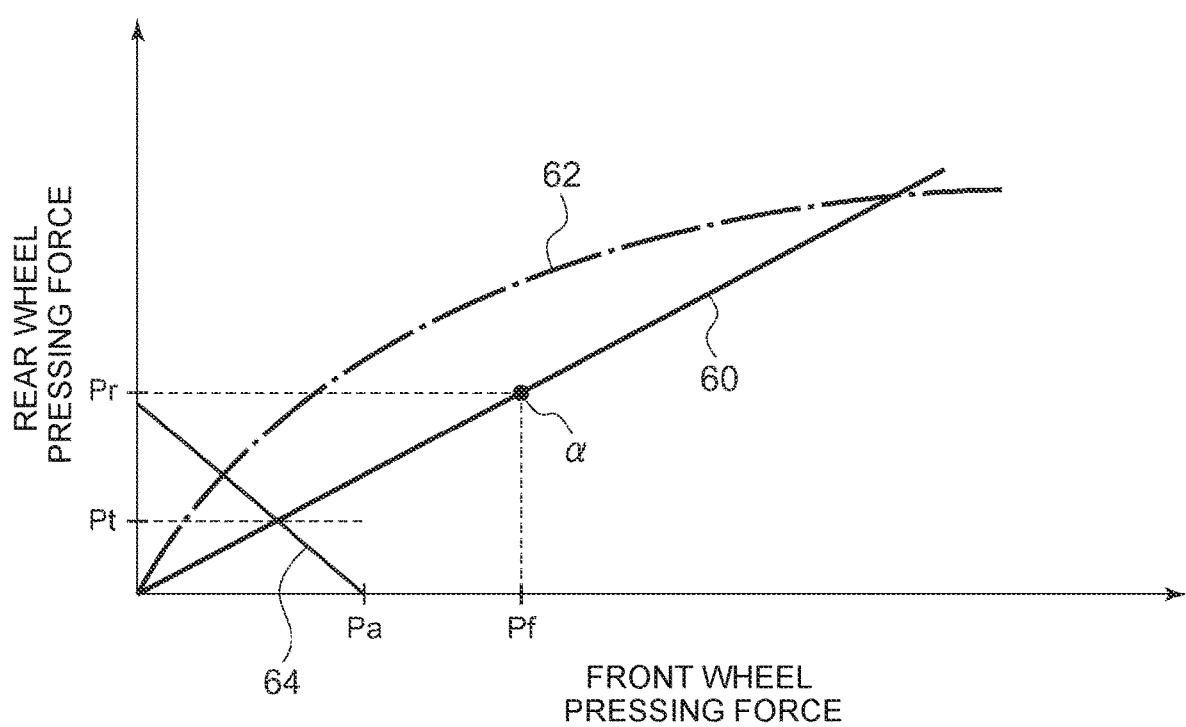
FIG. 4 is a graph illustrating distribution of a braking force to each wheel.

FIG. 4 is a graph illustrating the distribution of the braking force to each of the wheels. This example represents a relationship between the front wheels and the rear wheels in terms of the pressing force distribution. A normal distribution line 60 represents the distribution of the pressing force (the braking force) to the front and rear wheels during normal braking. An ideal distribution line 62 represents the ideal distribution of the pressing force (the braking force) to the front and rear wheels. A vertical axis represents the pressing force for the rear wheels, and the horizontal axis represents the pressing force for the front wheels. As indicated by the normal distribution line 60, when the target braking force for all of the wheels corresponds to a point a, the pressing force is distributed such that a pressing force Pf for the front wheels is larger than a pressing force Pr for the rear wheels.

For example, in the case where the pressing force for the rear wheels is larger than a specified pressing force Pt, the braking force distribution section 30 decides the individual target braking force for each of the front and rear wheels in accordance with the normal distribution line 60. In the case where the pressing force for each of the wheels falls within the noise region, the braking force distribution section 30 adjusts the individual target braking force decided by using the normal distribution line 60 such that the pressing force for each of the wheels avoids the noise region, that is, the pressing force for each of the wheels does not fall within the noise region. In the case where the pressing force for each of the wheels falls within the noise region, the braking force distribution section 30 adjusts the individual target braking forces by increasing the individual target braking force for the rear wheel and reducing the individual target braking force for the front wheel, so as to maintain the entire target braking force, for example. Note that the braking force distribution section 30 may distribute the braking force for the front and rear wheels in accordance with the ideal distribution line 62.

In the case where the pressing force for the rear wheel is equal to or smaller than the specified pressing force Pt, the braking force distribution section 30 executes the small pressing force control. In the case where the pressing force for the rear wheel is equal to the pressing force Pt, the braking force distribution section 30 sets the pressing force for the rear wheel to zero in accordance with a constant G line 64 that is used to maintain the target braking force of the entire vehicle. Then, the braking force distribution section 30 adds the magnitude of the pressing force corresponding to that for the rear wheel to the pressing force of the front wheel so as to set a pressing force Pa for the front wheel.

In this way, the braking force distribution section 30 can prevent braking with the pressing force that is equal to or smaller than the specified pressing force Pt, so as not to press the pad 42 against the rotor 40 with the extremely small pressing force P. This is because there is a possibility that a relationship between the pressing force and the noise region is not established when the pressing force is extremely small, and there is a case where it is difficult to adjust the individual target braking force for a purpose of avoiding the noise region. In view of the above, in the case where the pressing force for each of the wheels is equal to or smaller than the specified pressing force, or in the case where the target braking force is equal to or smaller than a specified braking force, the braking force distribution section 30 executes the small pressing force control to apply a brake only to the front wheels or only to the rear wheels, so as to prevent the generation of the brake noise. In the case where the pressing force for each of the wheels is larger than the specified pressing force Pt, or in the case where the target braking force is larger than the specified braking force, the braking force distribution section 30 executes normal control to avoid the generation of the brake noise.

On the basis of the individual target braking force for each of the wheels that is distributed by the braking force distribution section 30, the drive control unit 34 sends a drive signal for driving the motor 19 of the brake device 20 for each of the wheels. In this way, the generation of the brake noise in each of the wheels can be prevented.

Figure 5:
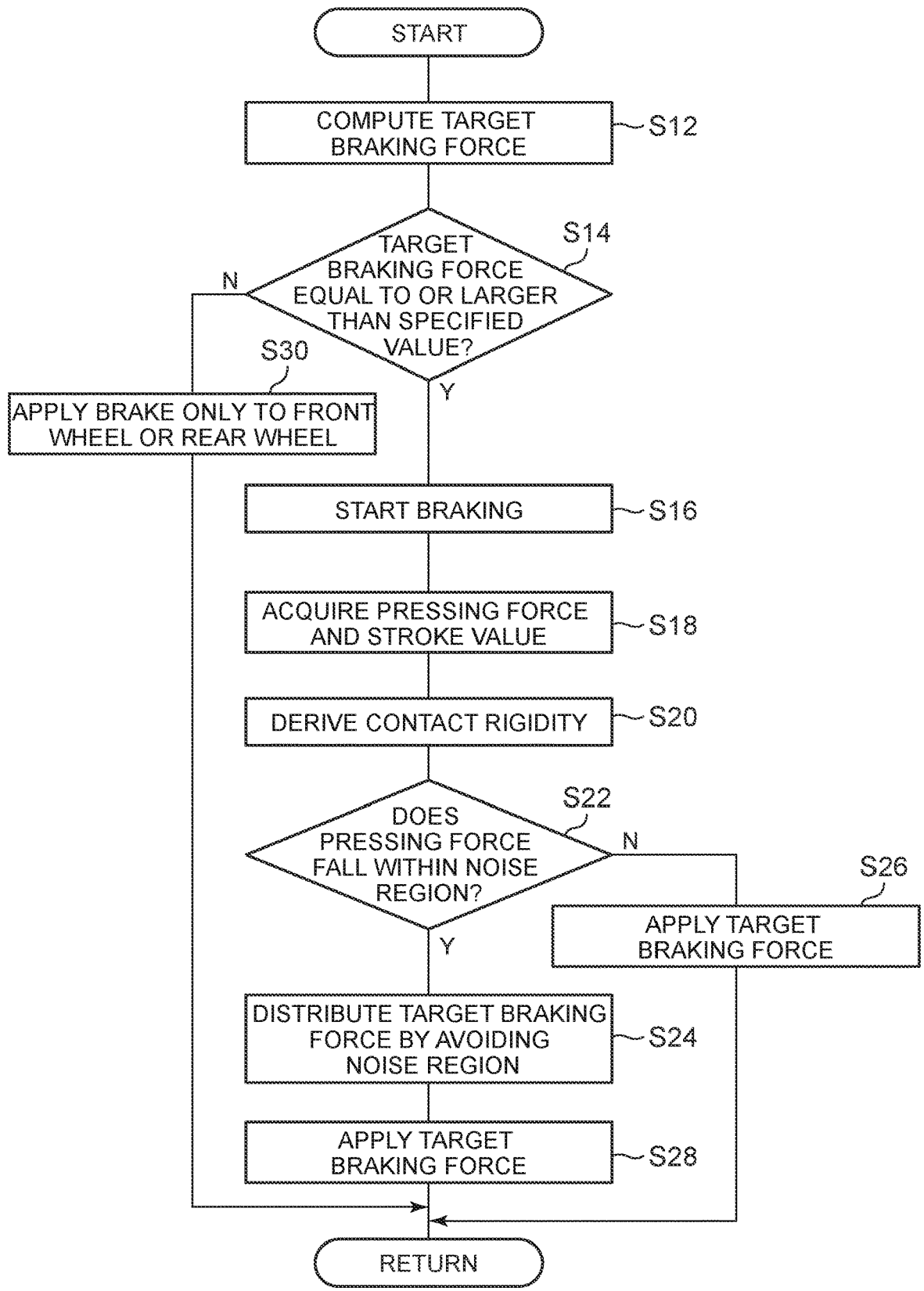
FIG. 5 is a flowchart illustrating control to avoid brake noise.

FIG. 5 is a flowchart illustrating the control to avoid the brake noise. The target braking force computation section 24 computes the target braking force of the entire vehicle on the basis of the output of the braking operation detection section 12, and computes the individual target braking force for each of the wheels (S12).

The braking force distribution section 30 receives the target braking force that is computed by the target braking force computation section 24, and determines whether the target braking force is equal to or larger than the specified value (S14). If the target braking force is not equal to or larger than the specified value (N in S14), the braking force distribution section 30 maintains the target braking force of the entire vehicle while distributing the individual target braking force such that the individual target braking force for one of the front wheel and the rear wheel is set to zero and the individual target braking force for the other of the front wheel and the rear wheel is increased. The drive control unit 34 drives each of the brake devices 20 according to the distributed individual target braking force (S30). In this way, the generation of the brake noise can be prevented while application of the pressing force that is equal to or smaller than the specified pressing force is prevented for braking.

If the target braking force is equal to or larger than the specified value (Y in S14), the drive control unit 34 starts braking (S16). The motor 19 of the brake device 20 is driven by the drive control unit 34, the piston 44 causes the stroke of the pad 42 toward the rotor 40, and the pad 42 abuts the rotor 40. At this time, the pressing force acquisition section 26 acquires the pressing force P of the pad 42 against the rotor 40, and the stroke acquisition section 28 acquires the stroke value S of the pad 42 toward the rotor 40 (S18).

The contact rigidity derivation section 32 derives the contact rigidity K on the basis of the pressing force P and the stroke value S that are acquired (S20). The braking force distribution section 30 derives the noise region of the pressing force in accordance with the contact rigidity K and determines whether a target pressing force of the pad 42 that corresponds to the individual target braking force for each of the wheels falls within the noise region (S22).

If the target pressing force of the pad 42 does not fall within the noise region (N in S22), the drive control unit 34 drives the motor 19 and applies the target braking force to each of the wheels without adjusting the individual target braking force for each of the wheels.

If the target pressing force of the pad 42 falls within the noise region (Y in S22), the braking force distribution section 30 maintains the target braking force of the entire vehicle while distributing the individual target braking force for each of the wheels in the manner to avoid the pressing force that falls within the noise region (S24). The drive control unit 34 drives each of the motors 19 on the basis of the distributed individual target braking force and applies the distributed braking force to each of the wheels. In this way, the generation of the brake noise can be prevented.

The disclosure has been described so far on the basis of the embodiment. The disclosure is not limited to the embodiment, and various modifications such as a design change can be made thereto. The configuration shown in each of the drawings merely illustrates one example and can appropriately be changed as long as the configuration can achieve the same functions.

In the embodiment, such an aspect that the motor 19 is used as the drive source of the brake device 20 has been described. However, the disclosure is not limited to this aspect. For example, the brake device 20 may be a hydraulic brake device that supplies pressurized brake fluid to the brake device 20.

In addition, in the embodiment, such an aspect that, if the target braking force is not equal to or larger than the specified value (N in S14 of FIG. 5), the braking force distribution section 30 executes the small pressing force control in which the individual target braking force is distributed so as not to apply the pressing force equal to or smaller than the specified pressing force to the rotor 40 of each of the wheels has been described. However, the disclosure is not limited to this aspect. For example, in the case where the small pressing force control is not executed and the target braking force is not equal to or larger than the specified value, the braking force distribution section 30 may decide the individual target braking forces for the front and rear wheels in accordance with the normal distribution line 60 and adjust the individual target braking forces such that the pressing force for each of the wheels avoids the noise region.

Furthermore, in the embodiment, such an aspect, in which as the contact rigidity K is increased, the braking force distribution section 30 derives the noise region where the range of the pressing force P is shifted such that the pressing force is increased, has been described. However, the disclosure is not limited to this aspect. For example, in the case where the contact rigidity K is equal to or higher than a specified value, a first noise region where the range of the pressing force P is shifted from a predetermined region such that the pressing force is reduced may be derived. In the case where the contact rigidity K is lower than the specified value, a second noise region where the range of the pressing force P is shifted such that the pressing force is increased from the first noise region may be derived. For example, the region A2 shown in FIG. 3B corresponds to an example of the first noise region, and the region A1 shown in FIG. 3A corresponds to an example of the second noise region. Note that the noise region may freely be set according to an experiment or the like as long as the noise region includes the range of the pressing force where the resonance frequency RF of the rotor system and the resonance frequency RF of the caliper system are close to each other.

Furthermore, in order to make the present disclosure easy to understand, in the embodiment, the brake controller is constituted by a plurality of sections as shown in FIG. 1. However, the present disclosure is not limited to this, and these sections can be combined or further divided. For example, the braking force distribution section 30 may be combined with the contact rigidity derivation section 32, the pressing force acquisition section 26 and the stroke acquisition section 28 and constitute a section that is able to distribute braking force based on the pressing force information and the stroke information received from the pressing force detection section 14 and the stroke detection section 16.

Note that the disclosure may be realized in various forms, for example as a control method for a brake, a control system for executing the control method, and so on.

What is claimed is:

1. A brake controller configured to control a brake device, the brake device applying a braking force to each of wheels by moving a pad toward a rotor provided for each of the wheels and pressing the pad against the rotor, the brake controller configured to distribute the braking force to each of the wheels such that a pressing force by which the pad is pressed against the rotor during braking is in a range other than a predetermined range, the brake controller comprising:
    a pressing force detection section configured to detect a pressing force information corresponding to the pressing force;
    a stroke detection section configured to detect a stroke information corresponding to a stroke amount of the pad toward the rotor during braking, wherein the brake controller sets the predetermined range based on the pressing force information and the stroke information; and
    a contact rigidity derivation section configured to derive, based on the pressing force information and the stroke information, a contact rigidity of the pad which comes into contact with the rotor, wherein the brake controller drives the predetermined range in accordance with the contact rigidity.

2. The brake controller according to claim 1, wherein the brake controller derives the predetermined range as a noise region corresponding to a range of the pressing force where brake noise is generated.

3. The brake controller according to claim 1, wherein the brake controller adjusts the predetermined range such that the pressing force is reduced as the contact rigidity is increased.

4. The brake controller according to claim 1, wherein:
    the brake controller derives a first predetermined range as the predetermined range such that the pressing force is reduced from a predetermined region in a case where the contact rigidity is equal to or higher than a specified value; and
    the brake controller derives a second predetermined range as the predetermined range such that the pressing force is increased from the first predetermined range in a case where the contact rigidity is lower than the specified value.

5. The brake controller according to claim 1, wherein:
    the pad is stroked toward the rotor by driving a motor;
    the pressing force detection section detects the pressing force information based on an output of a load sensor that detects the pressing force or an output of a current value acquisition section that acquires a current value supplied to the motor; and
    the stroke detection section detects the stroke information based on an output of a stroke sensor that detects the stroke amount of the pad or an output of a rotation angle detection section that detects a rotation angle of the motor.

6. The brake controller according to claim 1, wherein the brake controller distributes the braking force for each of the wheels so as not to apply the pressing force equal to or smaller than a specified pressing force to the rotor of at least one of a front wheel and a rear wheel.

7. The brake controller according to claim 1, further comprising a braking force computation section configured to compute a total braking force for a vehicle, wherein the brake controller distributes the braking force only to a front wheel or only to a rear wheel in a case where the total braking force that is computed by the braking force computation section is smaller than a specified value.

8. A brake control method for controlling a brake device, the brake control method setting a pressing force by which a pad of the brake device is pressed against a rotor of the brake device during braking such that the pressing force is in a range other than a predetermined range, the brake control method comprising:
    detecting a pressing force information corresponding to the pressing force;
    detecting a stroke information corresponding to a stroke amount of the pad toward the rotor during braking;
    setting the predetermined range based on the pressing force information and the stroke information; and
    deriving, based on the pressing force information and the stoke information, a contact rigidity of the pad which comes into contact with the rotor, wherein the brake control method derives the predetermined range in accordance with the contact rigidity.

9. A brake control system comprising:
    a brake device including a pad and a rotor, the brake device applying a braking force to each of wheels by moving the pad toward the rotor provided for each of the wheels and pressing the pad against the rotor; and
    a brake controller configured to:
        detect a pressing force information corresponding to a pressing force by which the pad is pressed against the rotor during braking;
        detect a stroke information corresponding to a stroke amount of the pad toward the rotor during braking;
        distribute the braking force to each of the wheels such that the pressing force is in a range other than a predetermined range;
    set the predetermined range based on the pressing force information and the stroke information; and
    derive, based on the pressing force information and the stroke information, a contact rigidity of the pad which comes into contact with the rotor, wherein the brake controller derives the predetermined range in accordance with the contact rigidity.

* * * * *